Patented Nov. 14, 1933

1,935,554

UNITED STATES PATENT OFFICE 1,935,554

ARYLIDES OF 2.3-HYDROXY-NAPHTHOIC ACID

Ernest F. Grether and Lindley E. Mills, Midland, Mich., assignors to The Dow Chemical Company, Midland, Mich., a corporation of Michigan No Drawing. Application April 24, 1931
Serial No. 532,692

11 Claims. (Cl. 260—124)

This invention relates to new arylides of 2.3-hydroxy-naphthoic acid, useful as dyestuff intermediates, and distinguished from those hitherto known in that the arylides hereinafter mentioned are formed by condensing substituted anilines having probably the general formula:

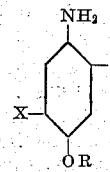

wherein X represents a halogen group, and wherein R and R' represent alkyl, aryl and/or aralkyl groups, with 2.3-hydroxy-naphthoic acid.

In our co-pending application, Serial No. 530,426, filed April 15, 1931, entitled "Azo dyes and method of making same", azo dyestuffs, prepared by coupling diazotized aromatic amines with arylides mentioned in this application are particularly described and claimed. An object of the present application is to describe the steps for the preparation of the aforementioned arylides of 2.3-hydroxy-naphthoic acid. Our invention, then, consists of the new arylides of 2.3-hydroxy-napththoic acid, together with the steps involved in making the same, hereinafter fully described and particularly pointed out in the claims, the following description setting forth certain procedure representative of various ways in which the principle of the invention may be used.

The herein described new arylides of 2.3-hydroxy-naphthoic acid are prepared by condensing said acid with various substituted anilines of the type already referred to, which substituted anilines were themselves prepared in the following way:—

Ortho-dichlorobenzene was chlorinated to obtain trichlorobenzene and the latter nitrated, either with concentrated nitric acid or with a mixture of nitric and sulfuric acids, to the corresponding trichloro-mono-nitrobenzene of M. P. 57° C., and having probably the formula;

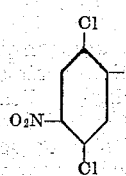

The dimethoxy derivative thereof, e. g. monochloro-dimethoxy-nitrobenzene, having probably the formula,

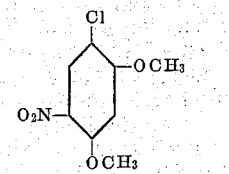

was formed by treating a boiling methyl alcohol solution of the above mentioned trichloro-nitrobenzene with slightly more than two molecular equivalents of sodium or potassium hydroxide dissolved in methyl alcohol. After the reaction was complete, the mixture was diluted with a large excess of water, filtered, and the residue recrystallized from methyl alcohol, M. P. 130° C.

Mono-chloro-diethoxy-nitrobenzene of M. P. 120.5° C. was prepared in similar manner as was chloro-dimethoxy-nitrobenzene, except that ethyl alcohol was used in place of methyl alcohol.

Mono-chloro-diphenoxy-nitrobenzene of M. P. 73.5° C. was prepared by treating a mixture of sodium or potassium phenolate with trichloronitrobenzene at approximately 220° C. for 4 hours. The product was distilled and the fraction distilling between 210–215° C. at 4 mm. collected.

The mono-chloro-dialkoxy-nitrobenzenes and mono-chloro-diphenyl-nitrobenzene were reduced with iron and acetic acid to the corresponding substituted anilines according to the usual way, viz.:—

In a 3 L. 3-neck flask fitted with an oil seal stirrer and reflux condenser were placed 400 grams of iron filings, 200 cc. of water, 50 cc. of ethyl alcohol and 2 cc. of glacial acetic acid. The mixture was stirred and refluxed for ½ hour, 0.25 of a gram molecular weight of the nitro compound being added in small quantities during this period. Stirring and refluxing were continued for from 4 to 16 hours, then 2 to 3 grams of sodium carbonate and 300 cc. of benzene added to the mixture. After stirring for an additional ½ hour, the benzene layer was separated, the aqueous layer filtered and the filtrate again extracted with a 300 cc. portion of benzene. The combined benzene extracts were then treated with an excess of concentrated hydrochloric acid. The hydrochloride of the amine precipitated either immediately or upon standing and was filtered from the mixture and washed with benzene. The yield was usually about 85 per cent theoretical. From the previously mentioned nitro compounds the following amines were prepared in the manner described; mono-chloro-dimethoxy-aniline of M. P. 90° C., mono-chloro-diethoxy-aniline of M. P. 63-64° C., mono-chloro-diphenoxy-aniline, the hydrochloride of which melts at approximately 126° C.

A preferred manner in which arylides comprising the invention may be prepared is illustrated in the specific examples given below, it being understood, however, that such examples are not to be construed as a limitation upon the invention:—

Example 1

The mono-chloro-dimethoxy-anilide of 2.3-hydroxy-naphthoic acid is prepared by heating equimolecular quantities of mono-chloro-dimethoxy-aniline and 2.3 - hydroxy - naphthoic acid in the presence of about 13 per cent of their combined weight (slightly more than ⅓ of a molecular equivalent) of phosphorus trichloride under reflux and in the presence of sufficient toluene to permit stirring, for a period of from 3 to 5 hours. The reaction product is neutralized by adding an excess of sodium carbonate and the toluene removed by distilling with steam. The aqueous residue containing the arylide produced in suspension therein is filtered, and the precipitate washed with water. The product is then purified by dissolving in dilute, 1 to 2 per cent, caustic alkali solution, preferably in the presence of alcohol, filtering from unreacted mono-chloro-diethoxy-aniline, and precipitating by acidification of the alkaline solution. The anilide so obtained, of approximate M. P. 195° C., is a fine powder, nearly white in color. It has probably the formula;

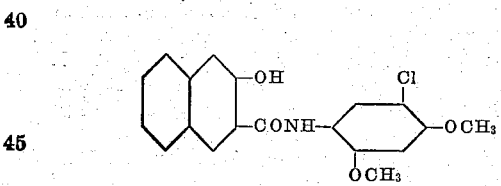

Example 2

The mono-chloro-diethoxy-anilide of 2.3-hydroxy-naphthoic acid was prepared by condensing mono-chloro-diethoxy-aniline, with 2.3-hydroxy-naphthoic acid, according to the method described in Example 1. The anilide so obtained, of approximate M. P. 165° C., is a fine powder, nearly white in color. It has probably the formula;

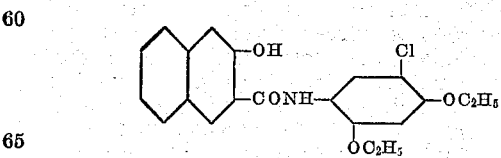

Example 3

By procedure similar to that described in Example 1, the mono-chloro-diphenoxy-anilide of 2.3-hydroxy-naphthoic acid was prepared by condensing mono-chloro-diphenoxy-aniline with 2.3-hydroxy-naphthoic acid. The anilide so obtained, of approximate M. P. 191° C., is a fine powder, nearly white in color. It has probably the formula,

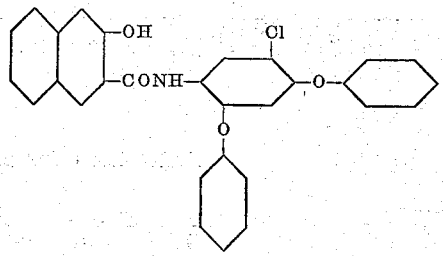

In similar manner, other 2.3-hydroxy-naphthoic acid arylides of related halo-di-alkoxy- and halo-di-aryloxy-anilines may be prepared, such compounds being characterized by the general formula;

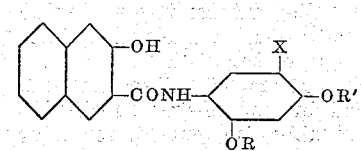

wherein X represents a halogen group and wherein R and R' represent residues selected from the group consisting of alkyl residues and aromatic residues of the benzene series.

Other modes of applying the principle of our invention may be employed instead of the one explained, change being made as regards solvents used or relative quantities of materials employed, provided the ingredients stated by any of the following claims or the equivalent of such ingredients be employed.

We therefore particularly point out and distinctly claim as our invention:—

1. In a method of making an anilide of 2.3-hydroxy-naphthoic acid, the step which consists of condensing a substituted aniline having probably the formula;

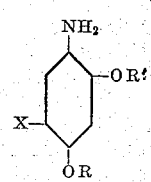

wherein X represents a halogen group, and wherein R and R' represent radicals selected from the class consisting of alkyl radicals and aromatic radicals of the benzene series, with 2.3-hydroxy-naphthoic acid in the presence of a condensing agent, the anilide so formed having probably the formula;

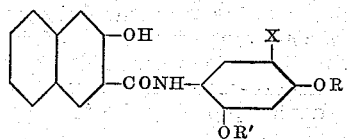

wherein X repesents a halogen group, and wherein R and R' represent radicals selected from the class consisting of alkyl radicals and aromatic radicals of the benzene series.

2. In a method of making an anilide of 2.3-hydroxy-naphthoic acid, the step which consists of condensing a substituted aniline having probably the formula;

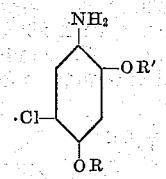

wherein R and R' represent radicals selected from the class consisting of alkyl radicals and aromatic radicals of the benzene series, with 2.3-hydroxy-naphthoic acid in the presence of phosphorous trichloride, the anilide so formed having probably the formula;

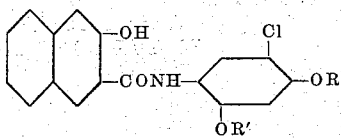

wherein R and R' represent radicals selected from the class consisting of alkyl radicals and aromatic radicals of the benzene series.

3. In a method of making a mono-chloro-dimethoxy-anilide of 2.3-hydroxy-napthoic acid, the step which consists of condensing mono-chloro-dimethoxy-aniline, having probably the formula;

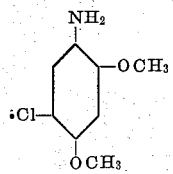

with 2.3-hydroxy-naphthoic acid in the presence of phosphorus trichloride, the anilide so formed having probably the formula;

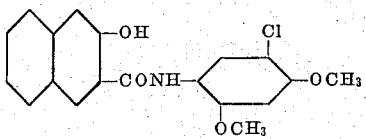

4. In a method of making a mono-chloro-diethoxy-anilide of 2.3-hydroxy-naphthoic acid, the step which consists of condensing mono-chloro-diethoxy-aniline, having probably the formula;

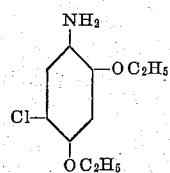

with 2.3-hydroxy-naphthoic acid in the presence of phosphorus trichloride, the anilide so formed having probably the formula;

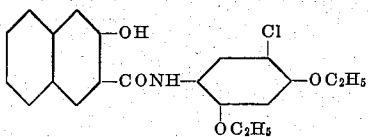

5. In a method of making a mono-chloro-diphenoxy-anilide of 2.3-hydroxy-naphthoic acid, the step which consists of condensing mono-chloro-diphenoxy-aniline having probably the formula;

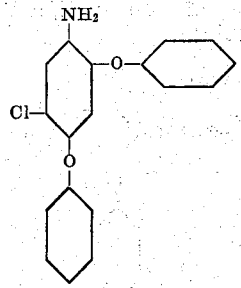

with 2.3-hydroxy-naphthoic acid in the presence of phosphorus trichloride, the anilide so formed having probably the formula;

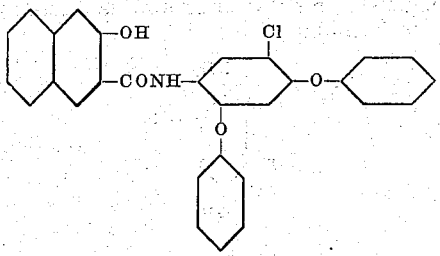

6. As a new compound, an anilide of 2.3-hydroxy-naphthoic acid having probably the general formula;

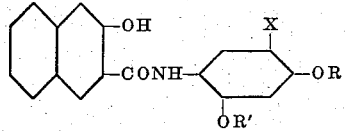

wherein X represents a halogen group, and wherein R and R' represent radicals selected from the class consisting of alkyl radicals and aromatic radicals of the benzene series.

7. As a new compound, an anilide of 2.3-hydroxy-naphthoic acid having probably the general formula;

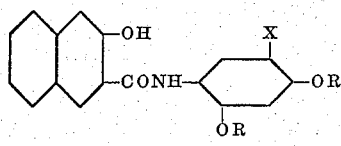
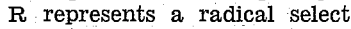

wherein X represents a halogen group, and wherein R represents a radical selected from the class consisting of alkyl radicals and aromatic radicals of the benzene series.

8. As a new compound, a mono-chloro-dimethoxy-anilide of 2.3-hydroxy-naphthoic acid, of approximate M. P. 195° C., and having probably the formula;

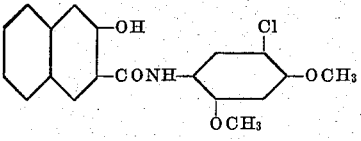

9. As a new compound, a mono-chloro-diethoxy-anilide of 2.3-hydroxy-naphthoic acid, of approximate M. P. 165° C., and having probably the formula;

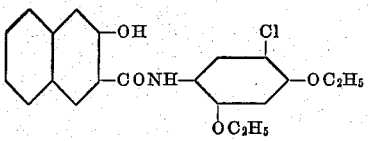

10. As a new compound, a mono-chloro-diphenoxy-anilide of 2.3-hydroxy-naphthoic acid, of approximate M. P. 191° C., and having probably the formula;

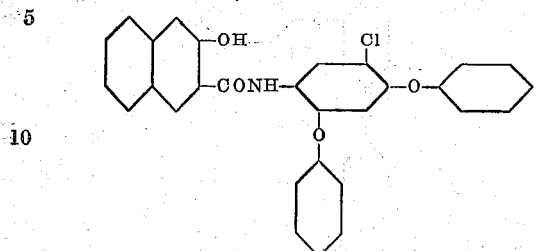

11. In a method of making an anilide of 2.3-hydroxynaphthoic acid, the step which consists of condensing a substituted aniline having probably the formula;

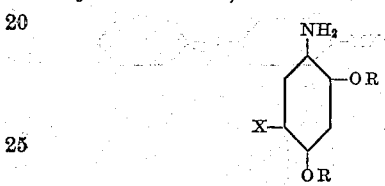

wherein X represents a halogen group and R represents a radical selected from the class consisting of alkyl radicals and aromatic radicals of the benzene series, with 2.3-hydroxynaphthoic acid in the presence of a condensing agent, the anilide so formed having probably the formula;

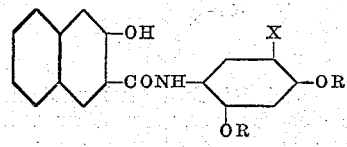

wherein X represents a halogen group and R represents a radical selected from the class consisting of alkyl radicals and aromatic radicals of the benzene series.

ERNEST F. GRETHER.
LINDLEY E. MILLS.

CERTIFICATE OF CORRECTION.

Patent No. 1,935,554. November 14, 1933.

ERNEST F. GRETHER, ET AL.

It is hereby certified that error appears in the printed specification of the above numbered patent requiring correction as follows: Page 1, line 87, for "diphenyl" read diphenoxy; and that the said Letters Patent should be read with this correction therein that the same may conform to the record of the case in the Patent Office.

Signed and sealed this 16th day of January, A. D. 1934.

F. M. Hopkins
(Seal) Acting Commissioner of Patents.